United States Patent [19]
Gerst et al.

[11] Patent Number: 5,969,258
[45] Date of Patent: Oct. 19, 1999

[54] EVALUATION UNIT OF A DIFFERENTIAL-PRESSURE SENSOR

[75] Inventors: Peter Gerst, Weil am Rhein; Karlheinz Banholzer, Hausen; Karl Flögel, Schopfheim; Peter Jung, Steinen, all of Germany

[73] Assignee: Endress & Hauser GmbH & Co., Maulburg, Germany

[21] Appl. No.: 08/902,170

[22] Filed: Jul. 29, 1997

[30] Foreign Application Priority Data

Aug. 21, 1996 [DE] Germany ............... 196 33 630

[51] Int. Cl.⁶ .................................................. G01L 9/12
[52] U.S. Cl. ......................... 73/718; 73/708; 361/283.4
[58] Field of Search ................... 73/708, 718, 724; 361/283.4

[56] References Cited

U.S. PATENT DOCUMENTS

| | | | |
|---|---|---|---|
| 5,000,048 | 3/1991 | Kordts | 73/708 |
| 5,012,677 | 5/1991 | Shimada et al. | |
| 5,097,712 | 3/1992 | Gerst et al. | |
| 5,111,698 | 5/1992 | Banholzer et al. | |

FOREIGN PATENT DOCUMENTS

| | | |
|---|---|---|
| 3504329 C2 | 11/1987 | Germany . |
| 39 32 443 C1 | 12/1990 | Germany . |
| 38 39 864 C2 | 3/1992 | Germany . |
| 41 10 447 A1 | 10/1992 | Germany . |
| 39 33 512 C2 | 2/1993 | Germany . |
| WO 85/04474 | 10/1985 | WIPO . |

OTHER PUBLICATIONS

Kirberish, L., "A Smart Transmitter for Differential Pressure Measurement," Journal A, vol. 32, No. 3, Oct. 1991, pp. 35–37.

Primary Examiner—Joseph L. Felber
Attorney, Agent, or Firm—Bose McKinney & Evans

[57] ABSTRACT

Evaluation unit of a differential-pressure sensor An evaluation unit of a differential-pressure sensor is provided which supplies an output signal which corresponds to a differential pressure ($\Delta P$) which has been corrected with respect to a measuring error due to the static pressure ($P_S$). The differential-pressure sensor has a capacitive single-chamber differential-pressure measuring cell with two capacitors (4, 5) as sensor element (1), and a temperature sensor (6) is arranged at the sensor element (1). The differential-pressure measured value is corrected by means of a first correction value ($\Delta K$) which is a measure of the static pressure ($P_S$) at a reference temperature ($T_R$). This correction value ($\Delta K$) is determined from the difference between a sensor temperature ($T_S$) determined by means of the temperature sensor (6) and a sum of a temperature discrepancy ($T_0$) and an internal temperature ($T_i$) assigned to the sum ($\Sigma$) of the reciprocal values of the capacitances of the two capacitors (4, 5).

9 Claims, 1 Drawing Sheet

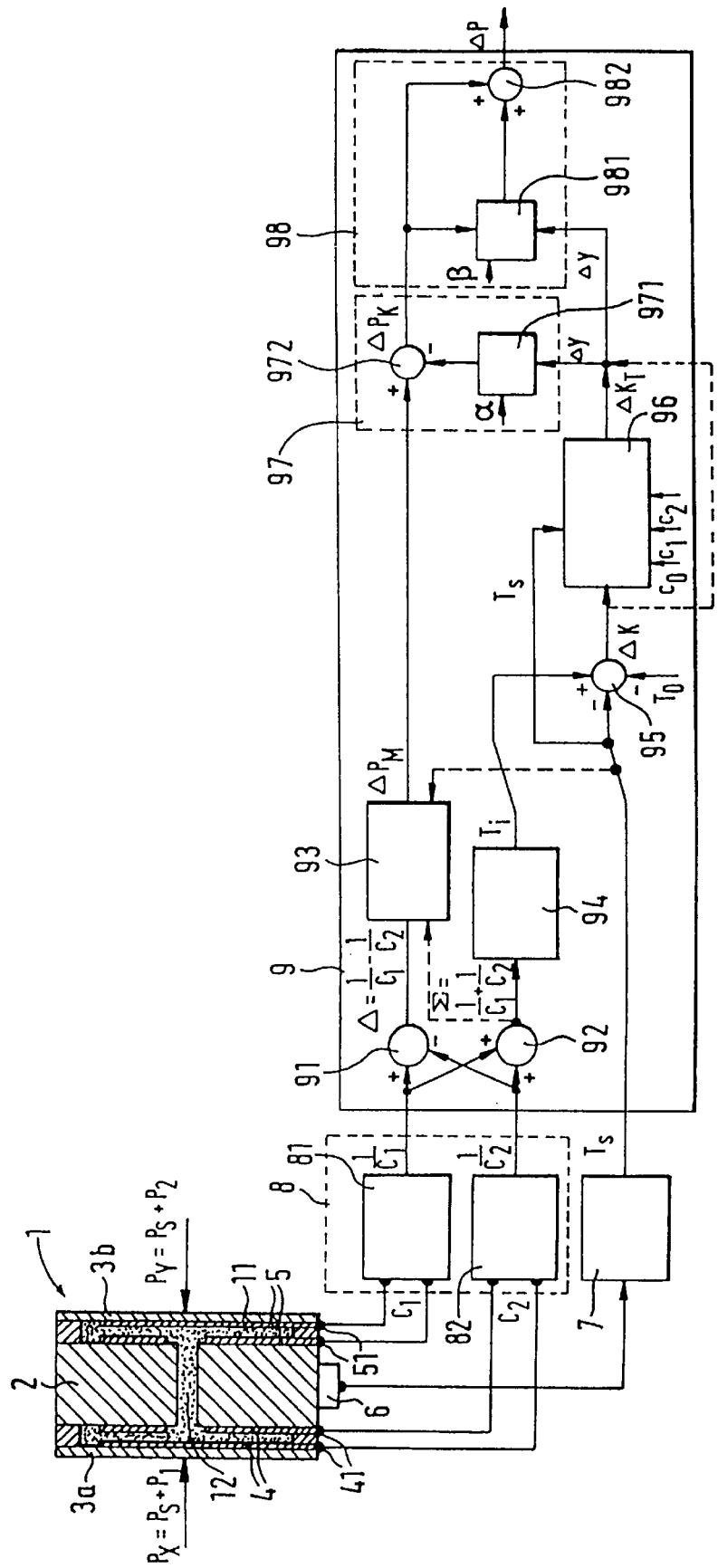

EVALUATION UNIT OF A DIFFERENTIAL-PRESSURE SENSOR

BACKGROUND AND SUMMARY OF THE INVENTION

The invention relates to an evaluation unit of a differential-pressure sensor having a sensor element with
- a liquid-filled measuring chamber,
- a first diaphragm to which a first process pressure which acts on the sensor element is applied, the first process pressure corresponds to the sum of a static pressure and a first pressure,
- a second diaphragm to which a second process pressure which acts on the sensor element is applied, which the second process corresponds to the sum of the static pressure and a second pressure, and
- two measuring capacitors whose capacitances change in the opposite direction to the difference between the first and second pressures and in the same direction as the static pressure, a temperature sensor which is arranged on the sensor element and a temperature measuring circuit which is connected to the temperature sensor and which supplies an output signal which corresponds to the sensor temperature, which evaluation unit comprises:

a measuring circuit for determining the respective reciprocal values of the capacitances of the measuring capacitors and an arithmetic unit
- which determines the sum of the reciprocal values of the two capacitances,
- which determines the difference between the reciprocal values of the two capacitances and assigns a differential-pressure measured value to said difference, and
- which outputs an output signal which corresponds to a differential pressure, specifically to the difference between the first and second pressures.

DE-C 39 32 443 describes an evaluation unit of a differential-pressure sensor having a sensor element with
- a liquid-filled measuring chamber,
- a first diaphragm to which a first process pressure which acts on the sensor element is applied, the first process pressure corresponds to the sum of a static pressure and a first pressure,
- a second diaphragm to which a second process pressure which acts on the sensor element is applied, the second pressure corresponds to the sum of the static pressure and a second pressure, and
- two measuring capacitors whose capacitances change in the opposite direction to the difference between the first and second pressures and in the same direction as the static pressure, a temperature sensor which is arranged on the sensor element and a temperature measuring circuit which is connected to the temperature sensor and which supplies an output signal which corresponds to the sensor temperature, which evaluation unit comprises:

a measuring circuit for determining the respective reciprocal values of the capacitances of the measuring capacitors and an arithmetic unit
- which determines the sum of the reciprocal values of the two capacitances,
- which determines the difference between the reciprocal values of the two capacitances and assigns a differential-pressure measured value to said difference, and
- which outputs an output signal which corresponds to a differential pressure, specifically to the difference between the first and second pressures.

In differential-pressure sensors with liquid-filled measuring chambers, an increase in temperature causes the filling liquid to expand. Both diaphragms are deflected outward. Consequently, the values of the two capacitances decrease. The sum of the reciprocal values of the two capacitances is thus a measure of the temperature and, in the case of the subject matter of DE 39 32 443, it is used to correct the differential-pressure measured value and/or measuring error due to temperature.

In addition, the sensor temperature is determined by means of the temperature sensor and the temperature-measuring circuit. If the deviation between the sensor temperature and a temperature which is to be expected on the basis of the sum of the capacitances exceeds a specified limit value, an error message is triggered.

In addition to the aforesaid measuring error due to temperature, a further measuring error, which is described below as the rated pressure error, occurs. Said further measuring error arises as a result of the fact that the static pressure causes the sensor element to be compressed in the axial direction, i.e. in the direction of the surface normal to the diaphragms, and to be correspondingly extended in the radial direction. This leads to a radial extension and thus to an increase in the rigidity of the diaphragms.

The deflection of the diaphragms rises essentially linearly with the differential pressure applied to the sensor element. This differential pressure-dependent deflection decreases essentially linearly as the static pressure rises. The static pressure always brings about an increase in the values of the two capacitances.

When the differential pressure acting on the sensor element is 0 Pa, the rated pressure error is proportional to the static pressure and arises as a result of asymmetries in the structure of the sensor element. This rated pressure error can therefore assume either positive or negative values. In contrast, the rated pressure error in the case of a differential pressure which is different from zero is always negative, i.e. an excessively low differential pressure is measured.

Both causes of errors, static pressure and temperature, affect the same measurement variables, specifically the values of the two capacitances, but must be treated differently when correcting the differential-pressure measured value.

In order to compensate the rated pressure error, it is therefore customary to use an additional sensor, by means of which the static pressure is determined. This sensor is to be mounted at a point at which it is actually subjected only to the static pressure and its measurement result is to be made available to an evaluation unit of the differential-pressure sensor.

An object of the invention is to specify an evaluation unit of a differential-pressure sensor, which unit generates an output signal which corresponds to a differential pressure which has been corrected in terms of its rated pressure error.

For this purpose, the invention consists in an evaluation unit which is distinguished by the fact that an internal temperature $T_i$ is assigned to the sum of the reciprocal values of the capacitances, the internal temperature $T_i$ being equal, with the exception of a temperature discrepancy, to the sensor temperature $T_S$, when there is no static pressure applied to the two diaphragms and the difference between the first and second pressures is equal to zero, a first correction value is determined in accordance with $$\Delta K = T_i - T_S - T_0,$$

which is a measure of the static pressure at a reference temperature, $T_0$ being the temperature discrepancy, determined at the reference temperature, between the sensor temperature $T_S$ and the internal temperature $T_i$, and a differential pressure which has been corrected with respect to a measuring error due to the static pressure is determined from the differential-pressure measured value using the first correction value.

According to one development of the invention, a second correction value is determined which is equal to the product of the first correction value and a polynomial of the sensor temperature, the polynomial having constant coefficients which are stored in a memory and which are determined in such a way that at a sensor temperature and a specific static pressure, the second correction value assumes in each case the value which the first correction value would assume at the reference temperature if the same static pressure were acting on the differential-pressure sensor.

According to one refinement, the differential-pressure measured value is corrected in terms of a measuring error due to temperature.

According to a further refinement, a differential pressure which has been corrected with respect to a displacement, due to the applied static pressure, of the zero point is determined from the differential-pressure measured value in accordance with $$\Delta P_K = \Delta P_M - \alpha \Delta Y,$$

$\Delta Y$ being a correction value which is equal to the first correction value when the differential-pressure sensor is used exclusively at temperatures which are equal to the reference temperature or deviate from it only insignificantly, and which is equal to the second correction value when the differential-pressure sensor is not used exclusively at temperatures which are equal to the reference temperature or deviate from it only insignificantly, and a being a constant zero-point correction factor stored in a memory.

According to a further refinement, the zero-point correction factor is equal to the quotient of a zero-point discrepancy and a reference correction value, the reference correction value being the first correction value recorded at a maximum permissible static pressure, at a differential pressure of 0 Pa and at a reference temperature and the zero-point discrepancy being the difference between a differential pressure measured at the reference temperature and at the maximum static pressure and a differential pressure likewise measured at the reference temperature, but at a static pressure equal to zero, a differential pressure of 0 Pa being applied to the differential-pressure sensor in order to determine the two differential pressures.

According to a further refinement, the differential pressure is determined from the corrected differential-pressure measured value in such a way that it is corrected with respect to a change in the span due to the applied static pressure, in accordance with $$\Delta P = (1 + \beta \Delta Y) \Delta P_K,$$

$\beta$ being a constant span correction factor stored in a memory.

According to a further refinement, the span correction factor is a characteristic variable of the differential-pressure sensor which is determined in accordance with the equation $$\beta = (S/I - 1) 1 / \Delta K_R,$$

S being a desired span, that is to say the measuring range span which the differential-pressure sensor is to have, and I being an actual span, that is to say the span which the differential-pressure sensor actually has at the reference temperature and at the maximum permissible static pressure, and $\Delta K_R$ being the reference correction value which is equal to the first correction value $\Delta K$ determined at the reference temperature $T_R$, at the maximum permissible static pressure $P_{S_{max}}$ and at a differential pressure of 0 Pa.

In this way, an evaluation unit is specified which permits the rated pressure error to be compensated without the value of the static pressure having to be made available by an additional sensor.

The invention and advantages thereof are explained in more detail with reference to the figure of the drawing, in which an exemplary embodiment is illustrated.

BRIEF DESCRIPTION OF THE DRAWINGS

FIG. 1 shows a schematic illustration of an evaluation unit of a differential-pressure sensor.

DETAILED DESCRIPTION OF THE INVENTION

FIG. 1 shows a differential-pressure sensor with a sensor element 1, which is arranged for example in a housing (not illustrated here). The sensor element 1 is for example a capacitive, cylindrical differential-pressure measuring cell with a liquid-filled measuring chamber 11. It comprises a cylindrical base body 2, on one of whose end sides a first diaphragm 3a is mounted and on whose second end side a second diaphragm 3b is mounted, in each case forming a cavity. The measuring chamber 11 has a capillary line 12 which connects the two cavities to one another. The diaphragms 3a, 3b and the base body 2 are composed of ceramic, for example, and are kept at a defined distance from one another and connected to one another in a hermetically sealed fashion by means of a connecting material, for example an activated hard solder. The inner faces of the diaphragms 3a, 3b and of the base body 2 are coated with electrode material and form two measuring capacitors 4, 5 whose capacitances $C_1$, $C_2$ depend on the deflection of the respective diaphragm 3a, 3b. The electrodes of the measuring capacitors 4, 5 each have connection points 41, 51, between which the respective capacitance $C_1$, $C_2$ can be measured. Such differential-pressure measuring cells are also referred to as capacitive single-chamber differential-pressure measuring cells.

A process pressure $P_x$ which corresponds to the sum of a static pressure $P_S$ and a first pressure $P_1$ is applied to the first diaphragm $3a$. A pressure $P_y$ which corresponds to the sum of the static pressure $P_S$ and a second pressure $P_2$ is applied to the second diaphragm $3b$.

If, for example, the first pressure $P_1$ is greater than the second pressure $P_2$, the first diaphragm $3a$ is deflected in the direction of the base body 2, the distance between the corresponding electrodes is reduced and the capacitance $C_1$ of the first measuring capacitor 4 rises. Accordingly, the second diaphragm $3b$ is deflected outward, the distance between the corresponding electrodes is increased and the capacitance $C_2$ of the second measuring capacitor 5 drops. Consequently, the capacitances $C_1$, $C_2$ of the two measuring capacitors 4, 5 change in the opposite direction to the difference between the first and second pressures.

A static pressure $P_S$ applied to the two diaphragms $3a$, $3b$ brings about an inward deflection of the two diaphragms $3a$, $3b$. Consequently, both capacitances $C_1$, $C_2$ increase in the same direction as the static pressure $P_S$.

Owing to the thermal expansion of the filling liquid, an increase in the temperature to which the sensor is subjected brings about an outward deflection of the two diaphragms $3a$, $3b$. The capacitances $C_1$, $C_2$ of the two measuring capacitors 4, 5 decrease.

A temperature sensor 6 is arranged at the sensor. Said temperature sensor 6 is for example a diode or a thermistor. The temperature sensor 6 is connected to a temperature measuring circuit 7 which supplies an output signal corresponding to a sensor temperature $T_S$.

The evaluation unit illustrated in FIG. 1 comprises a measuring circuit 8 and an arithmetic unit 9.

The measuring circuit 8 serves to determine the respective reciprocal values of the capacitances $C_1$, $C_2$ of the measuring capacitors 4, 5. It has two capacitance measuring circuits 81, 82 which are connected to the respective connection points 41, 51 and which emit output signals which correspond to the reciprocal values $1/C_1$, $1/C_2$ of the capacitances $C_1$, $C_2$.

The output signals of the first measuring circuit 8 and of the temperature measuring circuit 7 are applied to the arithmetic unit 9 for their further processing. The arithmetic unit 9 supplies an output signal which corresponds to a differential pressure $\Delta P$ which has been corrected in terms of the rated pressure error.

The sum $\Sigma$ of, and the difference $\Delta$ between, the reciprocal values of the two capacitances are determined in the arithmetic unit 9. The sum $\Sigma$ of the reciprocal values of the capacitances depends on the temperature and the static pressure $P_S$, and the difference $\Delta$ between the reciprocal values of the capacitances depends on the temperature, the static pressure $P_S$ and the difference between the first and second pressures $P_1$–$P_2$.

A subtractor circuit 91 is provided, and the output signals of the two capacitance measuring circuits 81, 82 are applied to its inputs. The subtractor circuit 91 supplies an output signal which corresponds to the difference between the two input signals.

Furthermore, an adder circuit 92 is provided, and the output signals of the two capacitance measuring circuits 81, 82 are likewise applied to its inputs. Said adder circuit 92 supplies an output signal which corresponds to the sum of the two input signals.

The output signal of the subtractor circuit 91 is applied to a differential-pressure computer 93 which assigns a differential-pressure measured value $\Delta P_M$ to the difference $\Delta$ between the reciprocal values of the capacitances $\Delta = 1/C_1 - 1/C_2$.

If the differential-pressure sensor is used only at a fixed temperature, a reference temperature $T_R$, or in a temperature range which is right next to this reference temperature $T_R$, the difference between the reciprocal values of the two capacitances $\Delta = 1/C_1 - 1/C_2$ can be assigned to the differential-pressure measured value $\Delta P_M$ for example in accordance with a characteristic curve stored in a memory.

However, differential-pressure sensors are usually used in a wide temperature range, for example $-20°$ C. to $80°$ C. In this case, compensation of a measuring error which is due to temperature must take place in the differential-pressure computer 93. Here, for example, a method can be used such as is described in DE-C 35 04 329, in which the difference between the reciprocal values of the two capacitances $\Delta = 1/C_1 - 1/C_2$ is selected to be equal to a first polynomial of the temperature T and of the differential-pressure measured value $\Delta P_M$, for example $$\Delta = 1/C_1 - 1/C_2$$
$$= a + bT + cT^2 + d\Delta P_M + e\Delta P_M^3 + f\Delta P_M T + g\Delta P_M T^2$$

and the sum of the reciprocal values of the two capacitances $\Sigma = 1/C_1 + 1/C_2$ is selected to be equal to a second polynomial of the temperature T and of the differential-pressure measured value $\Delta P_M$, for example $$\Sigma = 1/C_1 + 1/C_2$$
$$= h + iT + jT^2 + k\Delta P_M + l\Delta P_M^2.$$

The coefficients a to l can be determined using a calibration method. By solving the equation system which is set up by the two equations, a differential-pressure measured value $\Delta P_M$ which has been corrected in terms of the measuring error due to temperature is obtained.

Since the current sensor temperature $T_S$ is in any case available by means of the output signal of the temperature measuring circuit 7, it is likewise possible to solve only the first equation using the current sensor temperature $T_S$ for the temperature T, in order to obtain the differential-pressure measured value $\Delta P_M$.

Since any desired temperature-error corrections can be used, the connecting lines between the temperature measuring circuit 7 and the differential-pressure computer 93, and between the adder 92 and the differential-pressure computer 93 are indicated only using broken lines, but they are each based on a specific temperature correction.

The static pressure $P_S$ is not taken into account in the correction of the measuring error due to temperature. A static pressure $P_S$ of 0 Pa is used for the calibration.

The output signal of the adder circuit 92, which signal corresponds to the sum $\Sigma$ of the reciprocal values of the two capacitances $\Sigma = 1/C_1 + 1/C_2$, is applied to a temperature computer 94. The latter assigns to the sum $\Sigma$ a value referred to below as the internal temperature $T_i$, in accordance with a characteristic curve stored in a memory.

The internal temperature $T_i$ is, with the exception of a temperature discrepancy $T_0$ described below, equal to the sensor temperature $T_S$ which the temperature measuring circuit 7 determines when no static pressure $P_S$ is applied to the two diaphragms $3a$, $3b$, the difference between the first and second pressures is 0 Pa and the sum $\Sigma$ of the reciprocal values of the two capacitances $1/C_1 + 1/C_2$ has the value $\Sigma$.

A first correction value $\Delta K$ is determined from the internal temperature $T_i$ and the sensor temperature $T_S$. This takes place in a subtractor circuit 95 which is arranged in the arithmetic unit 9 and which supplies an output signal determined in accordance with the equation $$\Delta K = T_i - T_S - T_0.$$

The value of the sensor temperature $T_S$ and of the temperature discrepancy $T_0$ is therefore subtracted from the internal temperature value $T_i$.

The temperature discrepancy $T_0$ corresponds to that difference between the sensor temperature $T_S$ and the internal temperature $T_i$ which is determined at a differential pressure of D Pa, at a static pressure $P_S$ of 0 Pa and at a reference temperature $T_R$, for example 25° C., and is stored in a memory (not illustrated). In the entire text a static pressure of 0 Pa means that the sensor element 1 is subjected only to the atmospheric pressure, but not to an additional static pressure. This temperature discrepancy $T_0$ varies from sensor element to sensor element. Ideally it is equal to zero.

The first correction value $\Delta K$ is a measure of the static pressure $P_S$ acting on the two diaphragms 3a, 3b at the reference temperature $T_R$. In the borderline case of a vanishing static pressure $P_S$ the internal temperature $T_i$ and the sensor temperature $T_S$ correspond, with the exception of the temperature discrepancy $T_0$.

If the temperature deviates from this reference temperature $T_R$, i.e. if the sensor temperature $T_S$ differs from the reference temperature $T_R$, the first correction value $\Delta K$ depends not only on the static pressure $P_S$ but also on the temperature.

However, in order to correct the measuring error due to the static pressure $P_S$, it is necessary for a measure of the static pressure $P_S$ to be available. For use of the differential-pressure sensor at temperatures which deviate significantly from the reference temperature $T_R$, a second correction value $\Delta K_T$ is therefore generated in a further arithmetic circuit 96, which second correction value $\Delta K_T$ corresponds to the product of the first correction value $\Delta K$ and a polynomial which is a function of the sensor temperature $T_S$. This second correction value $\Delta K_T$ is determined, for example, in accordance with the equation $$\Delta K_T = (T_i - T_S - T_0)(c_0 + c_1 T_S + c_2 T_S^2)$$
$$= \Delta K (c_0 + c_1 T_S + c_2 T_S^2).$$

$c_0$, $c_1$ and $c_2$ are constant coefficients of the polynomial which are determined using a calibration method and are stored in a memory.

Of course, in order to achieve a higher degree of precision, a polynomial of a higher order, or a polynomial of a lower order with certain losses of precision, can be used.

The coefficients of the polynomial are to be selected such that the second correction value $\Delta K_T$ corresponds, at each permissible value of the sensor temperature $T_S$ within the precision limits prescribed by the degree of the polynomial, to the static pressure $P_S$ applied to the differential-pressure sensor.

They are determined using a calibration method in that at a given static pressure $P_S$ which is different from zero, preferably the maxim permissible static pressure $P_{Smax}$, the first correction value $\Delta K$ is determined at a number of different temperatures which is dependent on the degree of the polynomial, and at the reference temperature $T_R$. The first correction value determined at the reference temperature $T_R$ is a measure of the static pressure $P_S$ and is used as the desired value. The coefficients are determined from the measured data, for example by means of the Gaussian least squares method, in such a way that the deviation between the respective second correction value $\Delta K_T$ and the desired value is minimal.

The second correction value $\Delta K_T$ then constitutes a measure of the static pressure $P_S$, even at temperatures which deviate greatly from the reference temperature $T_R$.

The correction of the differential-pressure measured value $\Delta P_M$ takes place in two steps, specifically a correction of the zero point and a subsequent correction of the span of the differential-pressure measured value $\Delta P_M$.

The span designates the measuring range of the differential-pressure sensor, that is to say the difference between the measuring range end, for example the maximum permissible differential pressure or a measuring range end defined by the user, and the zero point.

The zero point correction takes place in an arithmetic circuit 97 to whose first input either the second correction value $\Delta K_T$ or, as indicated in FIG. 1 by the broken line, the first correction value $\Delta K$ is applied and to whose second input the differential-pressure measured value $\Delta P_M$ is applied. The first and second correction values $\Delta K$, $\Delta K_T$ are combined below under the designation correction value $\Delta Y$. Which of the two correction values is to be understood by the designation $\Delta Y$ depends on the temperatures at which the differential-pressure sensor is to be used.

The correction factor $\Delta Y$ is equal to the first correction factor $\Delta K$ when the differential-pressure sensor is used exclusively at temperatures which are equal to the reference temperature $T_R$ or differ from it only insignificantly, and it is equal to the second correction factor $\Delta K_T$ when the differential-pressure sensor is not used exclusively at the aforesaid temperatures.

The arithmetic circuit 97 generates an output signal which corresponds to a differential pressure $\Delta P_K$ which has been corrected with respect to a zero-point deviation due to the static pressure $P_S$. Said differential pressure $\Delta P_K$ is determined in accordance with the equation $$\Delta P_K = \Delta P_M - \alpha \, \Delta Y.$$

$\alpha$ designates a constant zero-point correction factor, $\Delta Y$ designates the aforesaid correction factor and $\Delta P_M$ designates the differential-pressure measured value.

The zero-point correction factor a preferably corresponds to the quotient of a zero-point discrepancy Z and a reference correction value $\Delta K_R$:

$$\alpha = Z/\Delta K_R.$$

The reference correction value $\Delta K_R$ is equal to the first correction value $\Delta K$ recorded at a differential pressure of 0 Pa, at a maximum permissible static pressure $P_{Smax}$ and at the reference temperature $T_R$. The zero-point discrepancy Z designates the difference between the differential pressure measured at the reference temperature $T_R$ and at the maximum permissible static pressure $P_{Smax}$ and the differential pressure likewise measured at the reference temperature $T_R$ but at a static pressure of 0 Pa, a differential pressure of 0 Pa being applied to the differential-pressure sensor in order to determine the two differential pressures.

The zero-point correction factor $\alpha$ is to be determined before the actual measurement and stored in a memory.

The arithmetic circuit 97 has a multiplier circuit 971 and a subtractor circuit 972. The multiplier circuit forms the product of the zero-point correction factor a and the correction factor $\Delta Y$ and makes an appropriate signal available to the input of the subtractor circuit 972. The output signal $\Delta P_M$ of the differential-pressure computer 93 is applied to a further input of the subtractor circuit 972. The product $\alpha \Delta Y$ is subtracted from the differential-pressure measured value $\Delta P_M$.

Thus, a signal which corresponds to a corrected differential pressure $\Delta P_K$ which has been determined in accordance with the equation $$\Delta P_K = \Delta P_M - \alpha \Delta Y$$

is available at the output of the arithmetic circuit 97 for further processing.

The correction of the span takes place in a further arithmetic circuit 98. The latter has two inputs to which the corrected differential pressure $\Delta P_K$ and the correction value $\Delta Y$ are applied.

A multiplier circuit 981 is provided, which forms the product of the correction value $\Delta Y$, a span correction factor $\beta$ and the corrected differential-pressure measured value $\Delta P_K$ and generates a corresponding output signal. The corrected differential-pressure measured value $\Delta P_K$ is added to this output signal in an adder circuit 982. Consequently, a signal which corresponds to the differential pressure determined in accordance with the equation $$\Delta P = (1 + \beta \Delta Y) \Delta P_K$$

is available at the output of the adder circuit.

The span correction factor $\beta$ is a characteristic variable of the differential-pressure sensor which is determined in accordance with the equation $$\beta = (S/I - 1) 1 / \Delta K_R,$$

is to be determined in advance and is to be stored in a memory. In the conditional equation for the span correction factor $\beta$, S designates the desired span, that is to say the measuring range span which the differential-pressure sensor is to have, I the actual span, meaning the span which the differential-pressure sensor actually has at the reference temperature $T_R$ and at the maximum permissible static pressure $P_S$, and $\Delta K_R$ the reference correction value which is equal to the first correction value $\Delta K$ determined at the reference temperature $T_R$, at the maximum permissible static pressure $P_{Smax}$ and at a differential pressure of 0 Pa.

The output signal $\Delta P$ of the evaluation unit is corrected in terms of the error due to temperature, if a corresponding correction takes place when the differential-pressure measured value $\Delta P_M$ is being determined. Furthermore, the output signal $\Delta P$ of the evaluation unit is corrected in terms of the rated pressure error. It thus corresponds to the actual differential pressure applied to the differential-pressure sensor.

Of course, the arithmetic unit 9 does not need to be present as an actual circuit in the form of electronic components. It can just as well entirely, or partially, take the form of an appropriately programmed micro-processor.

We claim:

1. An evaluation unit of a differential-pressure sensor having
    a sensor element (1) with
        a liquid-filled measuring chamber (11),
        a first diaphragm (3a) to which a first process pressure ($P_x$) which acts on the sensor element (1) is applied, the first process pressure corresponds to the sum of a static pressure ($P_S$) and a first pressure ($P_1$),
        a second diaphragm (3b) to which a second process pressure ($P_y$) which acts on the sensor element (1) is applied, the second process pressure corresponds to the sum of the static pressure ($P_S$) and a second pressure ($P_2$), and
    two measuring capacitors (4, 5) whose capacitances ($C_1$, $C_2$) change in the opposite direction to the difference between the first and second pressures and in the same direction as the static pressure ($P_S$),
    a temperature sensor (6) which is arranged on the sensor element (1) and
    a temperature measuring circuit (7) which is connected to the temperature sensor (6) and which supplies an output signal which corresponds to the sensor temperature ($T_S$), which evaluation unit comprises:
    a measuring circuit (8) for determining the respective reciprocal values ($1/C_1$, $1/C_2$) of the capacitances of the measuring capacitors (4, 5) and
    an arithmetic unit 9
        which determines the sum ($\Sigma$) of the reciprocal values ($1/C_1$, $1/C_2$) of the two capacitances,
        which determines the difference ($\Delta$) between the reciprocal values ($1/C_1$, $1/C_2$) of the two capacitances and assigns a differential-pressure measured value ($\Delta P_M$) to said difference, and
        which outputs an output signal which corresponds to a differential pressure ($\Delta P$), specifically to the difference ($P_1 - P_2$) between the first and second pressures, and wherein
    an internal temperature ($T_i$) is assigned to the sum of the reciprocal values of the capacitances ($\Sigma$),
        the internal temperature ($T_i$) being equal, with the exception of a temperature discrepancy ($T_0$), to the sensor temperature ($T_S$) when
            there is no static pressure ($P_S$) applied to the two diaphragms (3a, 3b) and the difference between the first and second pressures is equal to zero,
        a first correction value ($\Delta K$) is determined in accordance with $$\Delta K = T_i - T_S - T_0,$$

which is a measure of the static pressure ($P_S$) at a reference temperature ($T_R$),
        ($T_0$) being the temperature discrepancy ($T_0$), determined at the reference temperature ($T_R$), between the sensor temperature ($T_S$) and the internal temperature ($T_i$), and
    a differential pressure ($\Delta P$) which has been corrected with respect to a measuring error due to the static pressure ($P_S$) is determined from the differential-pressure measured value ($\Delta P_M$) using the first correction value ($\Delta K$).

2. The evaluation unit as claimed in claim 1, wherein a second correction value ($\Delta K_T$) is determined, which is equal to the product of the first correction value ($\Delta K$) and a polynomial of the sensor temperature ($T_S$),
    the polynomial having constant coefficients ($c_0$, $c_1$, $c_2$), which are stored in a memory,
    and which are determined in such a way that at a sensor temperature ($T_S$) and a specific static pressure ($P_S$) the second correction factor ($\Delta K_T$) assumes in each case the value which the first correction factor ($\Delta K$) would assume at the reference temperature ($T_R$) if the same static pressure ($P_S$) were acting on the differential-pressure sensor.

3. The evaluation unit as claimed in claim 2, wherein a differential pressure ($\Delta P_K$) which has been corrected with respect to a displacement, due to the applied static pressure ($P_S$), of the zero point is determined from the differential-pressure measured value ($\Delta P_M$) in accordance with $$\Delta P_K = \Delta P_M - \alpha \Delta Y,$$

$\Delta Y$ being a correction value, which is equal to the first correction value ($\Delta K$) when the differential-pressure sensor is used exclusively at temperatures which are equal to the reference temperature ($T_R$) or only deviate from it insignificantly and which is equal to the second correction value ($\Delta K_T$) when the differential-pressure sensor is not used exclusively at temperatures which are equal to the reference temperatures which are equal to the reference temperature ($T_R$) or deviate from it only insignificantly, and $\alpha$ being a constant zero-point correction factor which is stored in a memory.

4. The evaluation unit as claimed in claim 1, wherein the differential-pressure measured value ($\Delta P_M$) is corrected with respect to a measuring error which is due to the temperature.

5. The evaluation unit as claimed in claim 1, wherein a differential pressure ($\Delta P_K$) which has been corrected with respect to a displacement, due to the applied static pressure ($P_S$), of the zero point is determined from the differential-pressure measured value ($\Delta P_M$) in accordance with $$\Delta P_K = \Delta P_M - \alpha \Delta Y,$$

$\Delta Y$ being a correction value, which is equal to the first correction value ($\Delta K$) when the differential-pressure sensor is used exclusively at temperatures which are equal to the reference temperature ($T_R$) or only deviate from it insignificantly and which is equal to the second correction value ($\Delta K_T$) when the differential-pressure sensor is not used exclusively at temperatures which are equal to the reference temperatures which are equal to the reference temperature ($T_R$) or deviate from it only insignificantly, and $\alpha$ being a constant zero-point correction factor which is stored in a memory.

6. The evaluation unit as claimed in claim 5, wherein the zero-point correction factor ($\alpha$) is equal to the quotient of a zero-point discrepancy (Z) and a reference correction value ($\Delta K_R$), the reference correction value ($\Delta K_R$) being the first correction value ($\Delta K$) recorded at a maximum permissible static pressure ($P_{Smax}$), at a differential pressure of 0 Pa and at a reference temperature ($T_R$) and the zero-point discrepancy (Z) being the difference between a differential pressure measured at the reference temperature ($T_R$) and at the maximum static pressure ($P_{Smax}$) and a differential pressure likewise measured at the reference temperature ($T_R$), but at a static pressure equal to zero, a differential pressure of 0 Pa being applied to the differential-pressure sensor in order to determine the two differential pressures.

7. The evaluation unit as claimed in claim 6, wherein the differential pressure ($\Delta P$) is determined from the corrected differential-pressure measured value ($\Delta P_K$) in such a way that it is corrected with respect to a change in the span due to the applied static pressure ($P_S$), in accordance with $$\Delta P = (1 + \beta \Delta Y) \Delta P_K,$$

$\beta$ being a constant span correction factor stored in a memory.

8. The evaluation unit as claimed in claim 5, wherein the differential pressure ($\Delta P$) is determined from the corrected differential-pressure measured value ($\Delta P_K$) in such a way that it is corrected with respect to a change in the span due to the applied static pressure ($P_S$), in accordance with $$\Delta P = (1 + \beta \Delta Y) \Delta P_K,$$

$\beta$ being a constant span correction factor stored in a memory.

9. The evaluation unit as claimed in claim 8, wherein the span correction factor ($\beta$) is a characteristic variable of the differential-pressure sensor which is determined in accordance with the equation $\beta = (S/I - 1) 1/\Delta K_R$, S being a desired span, that is to say the measuring range span which the differential-pressure sensor is to have, I being an actual span, that is to say the span which the differential-pressure sensor actually has at the reference temperature ($T_R$) and at the maximum permissible static pressure ($P_{Smax}$), and $\Delta K_R$ being the reference correction value which is equal to the first correction value $\Delta K$ determined at the reference temperature $T_R$, at the maximum permissible static pressure $P_{Smax}$ and at a differential pressure of 0 Pa.

* * * * *

UNITED STATES PATENT AND TRADEMARK OFFICE
CERTIFICATE OF CORRECTION

PATENT NO. : 5,969,258
DATED : October 19, 1999
INVENTOR(S) : Peter Gerst, Karlheinz Banholzer, Karl Flögel and Peter Jung It is certified that error appears in the above-identified patent and that said Letters Patent is hereby corrected as shown below:

On the title page, item [73], please change the Assignee's name to the following:

Endress + Hauser GmbH + Co.

Signed and Sealed this

Twenty-fifth Day of April, 2000

Attest:

Q. TODD DICKINSON

*Attesting Officer*         *Director of Patents and Trademarks*